United States Patent Office 3,008,670
Patented Nov. 14, 1961

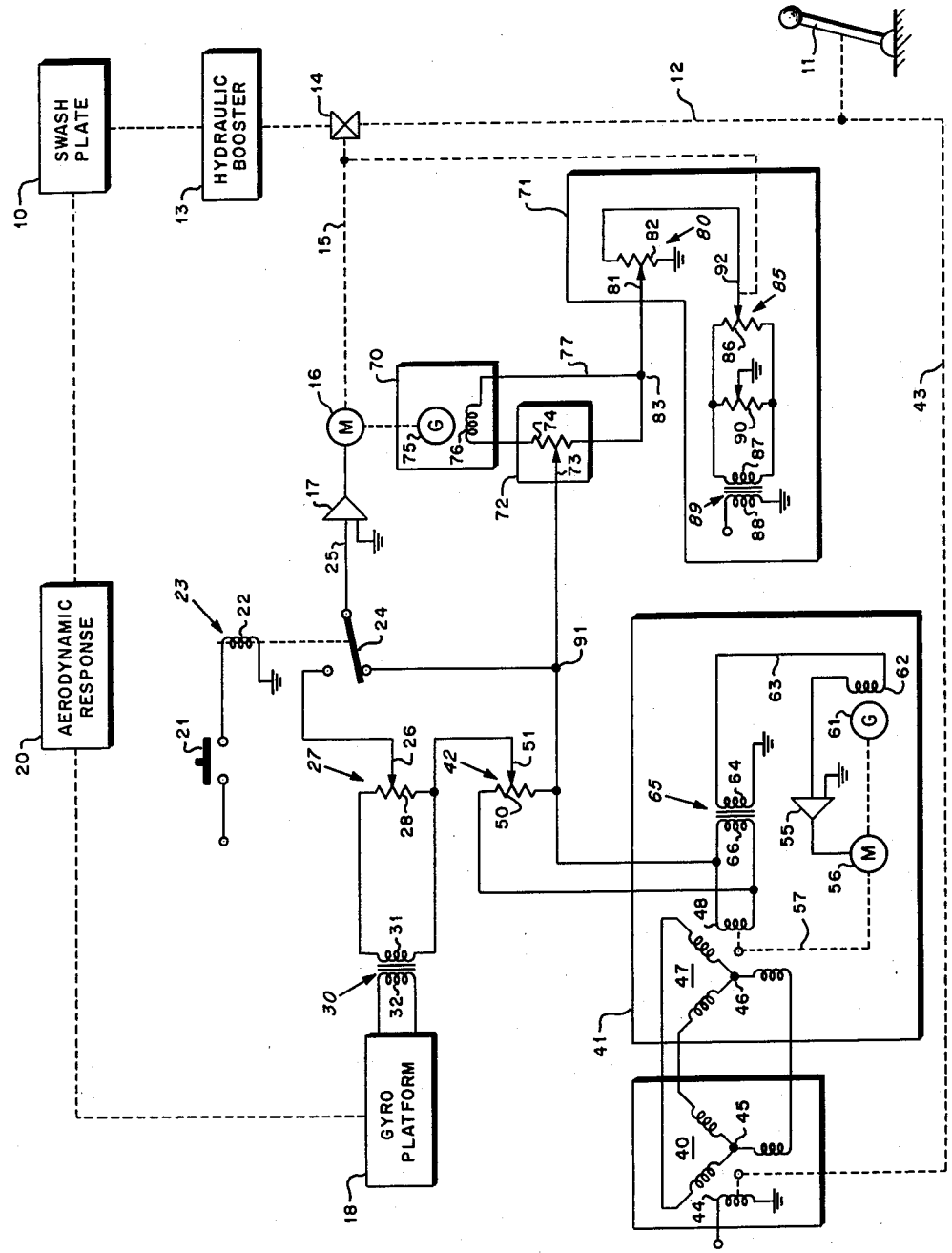

3,008,670
STABILITY AUGMENTATION SYSTEM
Louis S. Guarino, Hatboro, and Stephen J. Sikora, Warminster, Pa., assignors to the United States of America as represented by the Secretary of the Navy
Filed Dec. 29, 1959, Ser. No. 862,730
13 Claims. (Cl. 244—17.13)
(Granted under Title 35, U.S. Code (1952), sec. 266)

The invention herein disclosed may be manufactured and used by or for the Government of the United States of America for governmental purposes without the payment of any royalties thereon or therefor.

This invention relates to an automatic control surface damping system, and more particularly to a damping system for augmenting the stability of an inherently unstable aircraft such as a helicopter.

Due to the inherent aerodynamic instability of a helicopter and ambient conditions such as wind gusts, a pilot is required to be constantly readjusting the control surfaces such as the swash plate and/or tail rotor for the purpose of maintaining the aircraft on a selected flight path. The pilot of a helicopter usually suffers from fatigue after only a few hours flying time due, not only to vibrations and stiffness in the controls but to the necessity of constantly reorienting the controls.

It is, therefore, contemplated that the present invention will relieve the pilot of constantly attending to the correcting of the attitude of the aircraft and will permit the pilot to fly attitude only.

A principal object of the invention, therefore, is the provision of a novel automatic damping system for augmenting the stability of a helicopter.

Another object of the invention is the provision of a helicopter stability augmentation system capable of controlling the helicopter stability about the pitch axis, yaw axis, and/or roll axis regardless of whether instability of the helicopter is due to transient ambient conditions or vibrations.

Yet another object is to provide a helicopter stability augmentation system comprising gyro means mounted in the helicopter's fuselage for measuring rate of change in attitude of the fuselage and generating and transmitting a signal to a servo mechanism for readjusting a control surface, such as a swash plate and/or a tail rotor, for automatically damping the fuselage changes in attitude.

Another object of the invention is the provision of a system, as referred to in the preceding object, wherein means are provided for regulating the rate at which the servo means operate to automatically prevent the helicopter from building up any high rates of change of attitude which are hard to control.

A further object of this invention is to provide a novel helicopter stability augmentation system which operates automatically and independently of any automatic pilot and/or manual controls.

Another object of the invention is provision of a stability augmentation system as set forth in the preceding object wherein uncontrolled rate of change of fuselage attitude is compared with commanded change in fuselage attitude and an uncontrolled attitude rate of change signal is altered to compensate for a commanded attitude change signal and accordingly prevent the undercontrolling or the overcontrolling of the helicopter.

The invention further resides in certain novel features of construction, combinations and arrangements of parts, and further objects and advantages of the invention will be apparent to those skilled in the art to which it pertains from the following description of the present preferred embodiment thereof described with reference to the accompanying drawing which schematically illustrates an electromechanical apparatus embodying the invention.

It is to be understood that the invention is not limited to the details of construction and arrangement of parts shown in the drawing and hereinafter described in detail, but is capable of being otherwise embodied and of being practiced or carried out in various ways. It is to be further understood that the phraseology or terminology employed herein is for the purpose of description and there is no intention to herein limit the invention beyond the requirements of the prior art.

Referring to the drawing, the apparatus embodying the invention is preferably drawn to a damping and stability control arrangement for a swash plate 10 of a helicopter about the pitch axis of the latter. It is understood that the system can be similarly applied to the roll axis of the helicopter and/or applied to the yaw axis of the helicopter by applying the damping control arrangement to the tail rotor propeller pitch control apparatus.

Since the pitch axis damping or stability control arrangement is shown, a control stick 11 is shown for controlling the pitch attitude of the swash plate 10. The control stick 11, via a shaft arrangement 12, is adapted to directly mechanically control the swash plate 10. The shaft arrangement 12 controls the swash plate 10 in a manner similar to that disclosed in the Sikorsky U.S. Patent No. 2,517,509 issued August 1, 1950 and entitled "Helicopter Rotor Control." If desired, a hydraulic booster unit 13 can be used to ease the effort required of the pilot to control the attitude of the swash plate 10. A mechanical differential 14 is provided in the shaft arrangement 12 for motion supplied in a manner to be described by a drive shaft 15 of a synchro motor 16 connected to the output of a grounded amplifier 17.

The novel stability augmentation system, which is operable independently of any automatic pilot or manual controls such as the swash plate control stick 11 and the linkage 12, is comprised of a gyro platform 18 having a pitch gyroscope for generating an electrical signal proportional to rate of change of attitude of the helicopter along the pitch axis thereof. The gyro platform 18 is placed in a strategic location in the helicopter fuselage for sensing pitch attitude change rate. If desired, more than one gyro platform can be used, placed at different strategic locations. Aerodynamic response of the helicopter fuselage is schematically illustrated by the box 20 and represents the structural interrelationship between the swash plate 10 and the gyro platform 18 in the fuselage.

The stability augmentation system is put into operation by the closing of a normally open switch 21 and energizing a grounded solenoid coil 22 of a mechanically-held relay 23 and causing a normally open contact 24 to be closed. The closed contact 24 connects the input side of the amplifier 17 to the gyro platform 18 via a line 25, a wiper 26 of a helicopter rate potentiometer 27 having a resistance 28, and a transformer 30. The rate potentiometer 27 is adjustable for regulating the rate at which the swash plate 10 is operated by the stability augmentation system. The resistance 28 is connected across a secondary winding 31 of the transformer 30, which has a primary winding 32 connected to the pitch gyro of the platform 18 in a suitable manner. Preferably the potentiometer 27 is a control synchro or transformer which is manually adjusted to control the rate at which the servo motor 16 is driven, and accordingly, the rate of response of the damping of the transient signals generated by the pitch gyro. A slow response rate will smooth out and prevent response of the system to minute or short transient signals which usually tend to cancel each other out.

Signals from the gyro unit 18 will be altered to compensate for command signals to the swash plate 10 from the control stick 11, when the switch 21 is closed, via a stick pickoff control synchro unit 40. The unit 40 transmits a signal proportional to stick movement to the servo rate wiper 26 via a stick washout unit 41, stick position potentiometer 42, and the potentiometer resistance 28.

The stick signal and the gyro signal are connected to the rate potentiometer 27 in such a manner that if a helicopter fuselage is inadvertently caused to drift or fall off in the direction in which the pilot desires to fly while a command is being given to the stick 11, the signals will be matched and only the algebraic sum of the signals will be picked off by the wiper 26. This prevents over or under controlling of the helicopter. For example, if the fall rate signal from the gyro equals that of the command, the net signal output is zero. However, if the fuselage suddenly noses down when the pilot intends to bring the helicopter fuselage to a nose-up attitude, the two signals will be added together and fed to the amplifier 17 via the line 25.

More particularly, a mechanical linkage 43 responsive to mechanical command movement of the stick 11, angularly positions a rotor input coil 44 of the stick pickoff synchro 40, which is energized by a helicopter power supply, not shown. The stick command electrical signal is picked off by a Y-shaped stator winding 45, which transmits the electrical signal to a Y-shaped stator winding 46 of a control synchro 47. The stator windings 45 and 46 are connected back-to-back. A rotor coil 48 of the synchro 47 picks off the electrical command signal and conducts the signal to the helicopter rate potentiometer 27 via the stick position potentiometer 42, which may be in the form of a control transformer or synchro. A resistance 50 of the potentiometer 42 is connected across the rotor coil 48 and a wiper 51 picks off the stick command signal and feeds the signal to the resistance 27 in opposition to the gyro signal received in the secondary winding 31 of the gyro transformer 30. As a result of this organization, it will be clear that rate signals from the gyro platform means will be canceled by the command signal. Thus, during actual command operation of the aircraft the rate signals will be neutralized and threfore ineffective to change the attitude of the aircraft.

The electrical command signal generated in the stick pickoff unit 40 is preferably slowly nulled at the synchro 47 in the stick washout unit 41 by driving an amplifier 55. The output of the amplifier 55 drives a servo motor 56 which drives the rotor coil 48 to null position by a rotor shaft 57.

In order to prevent overrun of the synchro rotor 48 and accordingly prevent error from creeping into the electrical stick command signal provided across the stick position potentiometer resistance 50, the servo motor 56 drives a generator 61 to provide an electrical feedback signal in a pickoff coil 62 for the purpose of nulling the input signal to the amplifier 55. The signal from the synchro rotor 48 is picked off and fed to the amplifier 55 by means of a conduit 63 having a grounded secondary winding 64 of a transformer 65 therein. The secondary winding 64 picks off the stick command signal from a primary winding 66 connected across the synchro rotor coil 48.

The output of the amplifier 17 is nulled and accordingly the output shaft 15 of the servo motor 16 is stopped from rotating by a feedback follower unit 70 and a follow-up follower unit 71 which are each parallel to each other and are series connected to the input side of the amplifier 17 when the contact 24 is open and to the resistor 50 of the potentiometer 42 when the relay contact 24 is closed as is assumed to be the case in this instance.

The rate at which the pitch damping takes place is directly related to the setting of the potentiometer 27. However, the rate at which the output of the amplifier 17 is nulled depends upon the setting of a servo rate potentiometer unit 72. The unit 72 has a wiper 73 adjustable relative to a resistor 74 for causing the nulling signal to a resistor 74 to be increased or decreased according to the position of the wiper 73 along the resistor 74.

The feedback or follower unit 70 is a tachometric follower unit comprised of a generator 75 driven by the motor shaft 15. The driving of the generator 75 causes a feedback or nulling signal to be induced into a pickoff coil 76 which is fed via line 77 to the resistor 74 of the pitch damping rate potentiometer 72 and via the wiper 73 to the grounded amplifier 17 via potentiometers 42, 27, closed contact 24, and line 25.

In order to prevent overrun of the motor 16, the rate at which the nulling feedback signal from the followup unit 70 is fed to the amplifier 17 is governed by the followup follower unit 71. The unit 71 is comprised of a followup potentiometer 80 and a wiper 81 connected to junction 83. The adjustable wiper 81 is adapted to pick off a signal from a grounded resistor 82 and feed the signal to the resistor 74 of the servo rate potentiometer 72 in opposition at a point 83 to the signal from the feedback unit 70. The greater the opposition provided by the followup follower potentiometer 80, the slower the nulling response of the amplifier 17.

The resistor 82 is suitably connected to a suitable aircraft power supply. The potentiometer 80 is used to determine the amount that the control surface or swash plate 10 is positioned by the servo motor 16. This is preferably carried out by using a pitch followup transducer 85 having a resistor 86 and a wiper 92 connected in series with the resistor 82 and positioned by the servo motor 16. The resistor 86 is connected across a secondary winding 87 of a transformer 89 having a suitably electrically energized primary grounded winding 88. A center-tapped resistor 90 is connected across the winding 87 between the latter and the transducer 85 and in parallel with the same. Adjustment of the center-tap of the resistor 90 is used to center and calibrate the potentiometer 85. Should the switch 21 be opened or there be a failure, relay 23 will be deenergized and the relay contact 24 will be opened and electrically connect the input of the amplifier 17 via the line 25 to the followup and followup follower units 70, 71, but not to the now ungrounded stick washout unit 41, the stick pickoff unit 40 or the potentiometers 27 and 42. In other words, no signal branches off from point 91 to the potentiometer 42 or the washout unit 41.

The feedback unit 70 and the followup follower unit 71 accordingly feed directly to the input side of the amplifier 17 via the servo motor rate potentiometer 72, the contact 24, and line 25, as shown in the drawing, so that the servo motor 16 will always be nulled and ready to be put in operation when the switch 21 is closed.

Although the stability augmentation system is specifically drawn to an apparatus for damping along the pitch axis of a helicopter, it is understood that the yaw and roll axis may be stabilized or damped in substantially the same manner. Also, it is to be understood that the invention can be applied to other control surfaces and to other kinds of aircraft.

It is the intention to hereby cover not only the above-mentioned modifications of the preferred construction shown, but all adaptations, modifications, and uses thereof which come within the practice of those skilled in the art to which the invention relates, and the scope of the appended claims.

What is claimed is:

1. In a helicopter having a control surface and controls therefor, servo motor means, mechanical linkage means connecting said servo motor means with said control surface, amplifier means having an output connected to said servo motor means, follow-up means connected to said amplifier means providing a first signal thereto for nulling the output of said servo motor means, follow-up follower means connected to said mechanical linkage means providing a second signal in opposition to said first signal for preventing the overrun of said servo motor means, gyroscopic means for detecting and generating a signal proportional to any rate of deviation of fuselage attitude from a reference position, and means conducting said signal to the input of said amplifier means.

2. In a helicopter as set forth in claim 1, rate control means connected to said conducting means for governing the rate at which the control surface is returned to said reference position by said servo motor means, and said follow-up follower means being adjustable for determining the reference position of the control surface and delimiting the amount of movement of the control surface by said servo motor means.

3. In a helicopter as set forth in claim 2, control means, stick position pickoff means for monitoring command movement of said control means and generating a command signal, stick washout means for nulling said command signal, and means for connecting said command signal in opposition to said attitude change signal for permitting the helicopter to be operated via said control means without interference.

4. In a helicopter as set forth in claim 3, servo rate means for controlling the rate at which said servo motor means drives the control surface.

5. In a helicopter as set forth in claim 3, stick response rate potentiometer means for controlling the rate at which said command signal is transmitted.

6. In a helicopter having a control surface and surface control means therefor, servo motor means, mechanical linkage means connecting said servo motor means to said control surface and connecting the surface control means to the control surface, amplifier means having an output connected to said servo motor means, follow-up means connected to said amplifier means and providing a first signal thereto for nulling the output of said servo motor means, follow-up follower means connected to said mechanical linkage means providing a second signal in opposition to said first signal for preventing the overrun of said servo motor means, rate gyroscopic means for detecting and generating a third signal proportional to rate of deviation of the control surface from a reference position, means connecting said third signal to the input of said amplifier means for driving said servo motor means and said mechanical linkage means to cancel said deviation of the control surface from said reference position, and servo rate means connected to said gyroscopic means for controlling the rate at which said servo motor means drives said mechanical linkage and the control surface.

7. In a helicopter as set forth in claim 6, wherein said servo rate means comprises a potentiometer having a resistance connected to modify said signal and a wiper picking off said gyroscopic signal and feeding the same to said amplifier means.

8. In a helicopter as set forth in claim 7, wherein said follow-up means comprises a generator driven by said mechanical linkage means, a pickoff coil picking off any generator signal, and conductor means conducting said generator signal to said amplifier means in opposition to said gyroscopic signal.

9. In a helicopter as set forth in claim 8, wherein said follow-up follower means comprises a potentiometer having an electrically energized resistance and a wiper driven by said mechanical linkage means, and conducting means connected to said follow-up follower wiper and connected to said conductor means in opposition to said generator signal for modifying the latter and preventing overrun of said servo motor means, and the level of energization of said follow-up follower resistance determining the amount of rotation of said mechanical linkage means.

10. In a helicopter as set forth in claim 6, stick position pickoff means for monitoring command movement of the surface control means and generating a command signal, stick washout means for nulling said command signal, and means for connecting said command signal in opposition to said gyroscopic signal for permitting the helicopter to be controlled by said surface control means without interference.

11. In a helicopter as set forth in claim 10, wherein said stick pickoff means comprises a synchro transmitter having an energized rotor coil adapted to be positioned by the surface control means, and a stator coil for transmitting said command signal, and said stick washout means comprises a control transformer having a stator winding connected back-to-back to said stick pickoff stator coil and a rotor coil connected to said rate potentiometer resistance in such a manner that said command signal opposes said gyroscopic signal, and means for nulling said command signal.

12. In a helicopter as set forth in claim 11, wherein said command signal nulling means comprises, means for picking off the command signal from said stick washout rotor coil, an amplifier, and a servo motor connected to the output of said amplifier, said command signal driving said amplifier and said servo motor, said servo motor angularly positioning said stick washout rotor coil to a null position.

13. In a helicopter as set forth in claim 12, means for preventing the overrun of said servo motor comprising a generator driven by said servo motor, and a pickoff coil connected into said command signal pickoff means in such a manner as to oppose said command signal therein.

References Cited in the file of this patent

UNITED STATES PATENTS

| 2,862,167 | Curry | Nov. 25, 1958 |
| 2,936,135 | Zupanick | May 10, 1960 |

OTHER REFERENCES

Butz: Aviation Week, pages 67, 70 and 71, edition of Dec. 9, 1957.